United States Patent [19]
Hennessey

[11] Patent Number: 5,985,400
[45] Date of Patent: Nov. 16, 1999

[54] METHOD FOR FORMING A PROTECTIVE BARRIER LAYER ON AN OPTICAL MEMORY DISC SUBSTRATE

[75] Inventor: Michael Hennessey, South Lyon, Mich.

[73] Assignee: Tapematic S.p.A., Milan, Italy

[21] Appl. No.: 09/087,436

[22] Filed: May 29, 1998

[51] Int. Cl.⁶ ........................................................ B32B 3/00
[52] U.S. Cl. ........................ 428/64.1; 428/64.2; 428/64.4; 428/64.8; 428/913; 430/270.14; 430/495.1; 430/945; 369/283; 369/288
[58] Field of Search .................................. 428/64.1, 64.2, 428/64.4, 64.8, 913; 430/270.14, 495.1, 945; 369/283, 288

[56] References Cited

U.S. PATENT DOCUMENTS

| | | |
|---|---|---|
| 4,594,265 | 6/1986 | Van Vonno et al. . |
| 5,132,152 | 7/1992 | Gotoh et al. ............................ 428/64.1 |
| 5,485,935 | 1/1996 | Foltz et al. . |
| 5,562,840 | 10/1996 | Swain et al. . |
| 5,580,473 | 12/1996 | Shinohara et al. . |
| 5,824,768 | 10/1998 | Burns et al. ............................ 528/422 |

*Primary Examiner*—Elizabeth Evans
*Attorney, Agent, or Firm*—Frommer Lawrence & Haug LLP

[57] ABSTRACT

A method for forming a protective barrier layer between the active dye layer and the disc substrate during production of an optical memory disc is provided wherein a pre-treatment/pre-coat solution is applied to the disc substrate. This pre-treatment/pre-coat solution includes a surface modifier having an index of refraction approximately equal to that of the disc substrate. Surface modifiers utilized in this pre-treatment/pre-coat solution include poly vinyl alcohol, poly alpha methyl styrene, cellulose acetate, poly vinyl butyral and nitrocellulose.

36 Claims, 1 Drawing Sheet

METHOD FOR FORMING A PROTECTIVE BARRIER LAYER ON AN OPTICAL MEMORY DISC SUBSTRATE

FIELD OF THE INVENTION

The present invention relates to a method for conditioning the surface of an injection molded polymeric substrate used during the manufacture of an optical memory disc, and more particularly, to a method for forming an interface conditioning barrier layer between the active recording layer and the disc substrate used during the production of a write once optical memory disc, such as a CD-R or DVD-R optical memory disc.

BACKGROUND OF THE INVENTION

The typical structure of a CD-R or DVD-R optical memory disc includes an energy absorbing dye layer formed directly over an injection molded polymeric substrate. Next, a thin film reflective layer is formed directly over the dye layer, usually via magnetron sputtering. Finally, a radiation curable protective lacquer is spin coated directly over the reflective layer. The reflective layer also functions as a barrier to isolate the dye layer from the uncured protective lacquer.

In most optical memory disc structures, dielectric layers are also formed between the active recording layer and adjacent layers, in order to protect the substrate and reflective layers from exposure related damage, and to encapsulate the active recording layer, protecting it against chemical contamination and long term deterioration. In a typical CD-R or DVD-R disc, these additional layers are omitted to reduce manufacturing cost. The dye (active recording layer) is coated directly onto the surface of the polymeric substrate, and the reflective layer is formed directly over the dye layer. Consequently the dye/substrate interface, and the dye/reflective layer interface are directly effected by the recording process. Because CD-R and DVD-R are "write once" formats, cumulative degradation does not develop as it would in a re-writable optical memory disc. However, cumulative degradation is not the only concern. The physical and chemical characteristics of the interface between the dye and substrate, and the dye and the reflective layer effect the exposure and read back performance of the optical memory disc. For example, the energy associated with the exposure process effects the surface of the polymeric substrate at the interface with the active recording layer. This causes an intermixing of decomposed dye and polymer. The degree of intermixing is related to the time at temperature profile created during exposure. When a recording format with a large range of pulse widths is employed, as is the case with CD-R and DVD-R, the longer pulses tend to be distorted by this mechanism. Another problem is distortion of the thin film reflective layer by the heat and pressure created during exposure. This distortion extends beyond the location of the intended mark, and has the effect of increasing the apparent size of the recorded mark. The negative effects of this distortion are most apparent when the spaces between recorded marks are short. Mark length deviation, inter-symbol interference, and jitter performance are all negatively effected by this "doming" effect. The exact profile of this distortion depends on the physical properties of the reflective layer, adhesion between the reflective layer and the underlying layer, and the characteristics of any layers coated on top of the reflective layer, such as a protective lacquer or bonding adhesive.

Reflective films thicker than approximately 100 nm tend to resist distortion caused by the exposure process. However, thick reflective layers typically exhibit higher stress which can lead to a variety of long term reliability problems. Additionally, the high thermal conductivity of typical metallic reflective films effects overall record sensitivity, and alters the thermal profile that develops during the formation of individual recorded marks. Consequently, reflective layer thickness cannot be arbitrarily changed in order to minimize physical distortion.

Disc manufacturing problems also result from inadequate preparation of the polymeric substrate. Due to well-known variables associated with the injection molding of plastics, the surface characteristics of the substrates are not absolutely constant. Without some means to provide a uniform and consistent surface condition, these variations in the substrate will effect the dye coating process and, therefore, achievable disc performance.

Further, the solvents used to prepare the dye for spin coating extract volatiles from the plastic substrate during the spin coating operation. This results in non-uniform spin coating performance, and contamination of the excess dye solution that is spun off of the disc. Typical substances that are leached out of the substrate include stabilizers, molding release agents, degraded polymer, residual monomer (etc.), and various adsorbed contaminants from the local environment. Correcting this situation will improve dye coating consistency, and increase manufacturing yield. Reducing contamination of the excess dye solution will allow the dye to be recycled more times, further reducing manufacturing costs.

The traditional solution to this problem would be to vacuum coat a thin film dielectric barrier onto the substrate prior to spin coating the dye. Unfortunately, this approach is complex and has the added disadvantage of high initial equipment cost.

Alternatively, treating the substrate with ultraviolet light, or a combination of ultraviolet light and ozone, will create a clean, uniform surface. Unfortunately, this is only a surface effect and does not reduce the tendency for volatiles to be leached out of the substrate by the solvents used in the dye solution.

Pre-rinsing the substrate surface with a solution that extracts volatiles, dilutes them, and washes them away will tend to reduce subsequent dye solution leaching of these substances. However, pre-rinsing the substrate surface with a buffered solvent will not guarantee a uniform surface with a stabilized, low level of extractables.

Therefore, it has been found desirable to provide an economical, pre-treatment/pre-coating layer between the disc substrate and the active dye layer of an optical memory disc which not only extracts volatiles, dilutes them, and washes them away, but also provides a uniform barrier to subsequent leaching by the solvents used for the dye solution. Moreover, it has been found desirable to provide a protective barrier layer which does not significantly alter the optical tuning of the disc structure, in order to minimize manufacturing complexity and cost.

OBJECTS OF THE INVENTION

It is therefore an object of the present invention to provide an interface conditioning barrier layer for a recordable optical memory disc, between the disc substrate and the active dye layer, which avoids the aforementioned disadvantages of the prior art.

It is a further object of the present invention to provide a pre-treatment/pre-coat solution which is an economical means of forming an interface conditioning barrier layer between the active dye layer and the substrate material of a recordable optical memory disc.

A further object of the present invention is to provide a pre-treatment/pre-coat, which forms an interface conditioning barrier layer between the active dye layer and the substrate material of a recordable optical memory disc, which removes substrate surface contaminants, dilutes them, and washes them away.

A further object of the present invention is to provide pre-treatment/pre-coat, which forms an interface conditioning barrier layer between the active dye layer and the substrate material of a recordable optical memory disc, which extracts volatiles from the substrate, dilutes them, and washes them away.

It is a further object of the present invention to provide a pre-treatment/pre-coat, which forms an interface conditioning barrier layer between the active dye layer and the substrate material of a recordable optical memory disc, which reduces subsequent leaching of volatiles and removal of contaminants from the substrate by the dye coating solution.

Another object of the present invention is to provide an interface conditioning barrier layer, between the active dye layer and the substrate material of a recordable optical memory disc, which provides a stabilized substrate surface, resulting in more uniform and consistent dye coating.

A further object of the present invention is to provide an interface conditioning barrier layer, between the active dye layer and the substrate material for a recordable optical memory disc, which is a simple, economical surface treatment.

A further object of the present invention is to provide an interface conditioning barrier layer, between the active dye layer and the substrate material for a recordable optical memory disc, which is a simple, economical surface coating.

Still another object of the present invention is to provide a pre-treatment/pre-coat solution, which forms an interface conditioning barrier layer between the active dye layer and the substrate material of a recordable optical memory disc, which does not significantly alter the optical tuning of the coating stack.

Various other objects, advantages and features of the present invention will become readily apparent from the ensuing detailed description, and the novel features will be particularly pointed out in the appended claims.

SUMMARY OF THE INVENTION

In accordance with the present invention, a method for conditioning the interface between a polymeric substrate and subsequently formed active dye layer is provided. The formation of this interface conditioning barrier layer is desired in order to improve dye coating consistency and uniformity, and to reduce contamination of recycled dye solution, thereby lowering manufacturing costs. The conditioning process is comprised of two distinct phases. The first phase is substrate cleaning, in which volatiles and other contaminants are removed, diluted, and washed away. The second phase involves the formation of a barrier to further leaching of volatiles by the dye solution. Both objectives are achieved by using a single pre-treat/pre-coat solution which cleans the substrate and also forms a continuous surface modifying layer on the substrate as the pre-treat/pre-coat solvents evaporate.

The desired objectives of solvent system and surface modifier used in the pre-treat/pre-coat solution of the present invention will be next described. The solvents must be able to extract volatiles and contaminants from the substrate without damaging the surface. Even the smallest amount of substrate surface damage will reduce achievable CNR and create random bursts of noise during read back. Additionally, the modified substrate surface must exhibit excellent resistance to the solvents used in the dye solution. If this is not the case, the result is to simply substitute one form of contamination for another.

The minimum useful thickness of the interface conditioning barrier layer is determined by the effectiveness of the surface modifier in reducing the leaching of residual volatiles from the substrate. Pre-treat/pre-coat solutions ranging from between approximately 0.01% to 5% dissolved solids have been evaluated. Generally, it is desirable to use the thinnest layer that is effective. As layer thickness increases, secondary effects begin to develop. These secondary effects include changes in jitter, MLD, reproduced waveform shape, pre-groove diffraction, and reflectivity. It has been found that selecting a surface modifier with a refractive index approximating that of the substrate (approximately 1.55 for polycarbonate, and approximately 1.49 for poly methyl methacrylate), with or without significant absorption at the write/read laser wavelengths, allows the use of a film thickness that partially planarizes the pre-groove structure without creating complex optical interference effects. For the pre-treatment/pre-coat solution of the present invention, the surface modifier has a refractive index between approximately 1.45 to 1.57 when measured at comparable wavelength and temperature conditions as the disc substrate. Further, by selecting a material that decomposes before the substrate surface is significantly altered by the recording process, actual groove geometry can be dynamically changed by the recording process. This effect can be used to extend the acceptable range of initial substrate pre-groove profiles.

The following pre-treatment/pre-coat solutions have been investigated and found to provide acceptable substrate cleaning and formation of a protective barrier layer between the disc substrate and the active dye recording layer:

1) approximately 0.01% to 4.0% poly vinyl alcohol; dissolved in a mixture of water and various co-solvents. Representative co-solvents include 2-butoxy ethanol, 2-propoxy ethanol, ethanol, methanol, isopropyl alcohol, and/or acetic acid.
2) approximately 0.01% to 5% poly alpha methyl styrene, dissolved in various terpenes and co-solvents.
3) approximately 0.01% to 5% cellulose acetate; dissolved in diacetone alcohol, 2-methoxy ethanol, 2, 2, 3, 3-tetrafluoro-1-propanol, and/or acetic acid.
4) approximately 0.01% to 5% poly vinyl butyral, dissolved in 2-butoxy ethanol, 2-propoxy ethanol, isopropyl alcohol, and/or acetic acid.
5) approximately 0.01% to 5% nitrocellulose, dissolved in 2-butoxy ethanol, 2-propoxy ethanol, with various co-solvents, such as methanol and N-butyl alcohol.

The pre-treatment/pre-coat can be applied in various manners. However, methods that completely and effectively wash the surface are preferred. These include total immersion with ultrasonic agitation followed by vapor phase drying, total immersion with ultrasonic agitation followed by spin rinsing/drying, and spin rinsing/drying. Of these methods, spin rinsing/drying is currently preferred because of its compatibility with existing manufacturing equipment.

BRIEF DESCRIPTION OF THE DRAWINGS

The following detailed description, given by way of example, will be best understood in conjunction with the accompanying drawing in which.

DETAILED DESCRIPTION OF CERTAIN PREFERRED EMBODIMENTS

Figure 1:
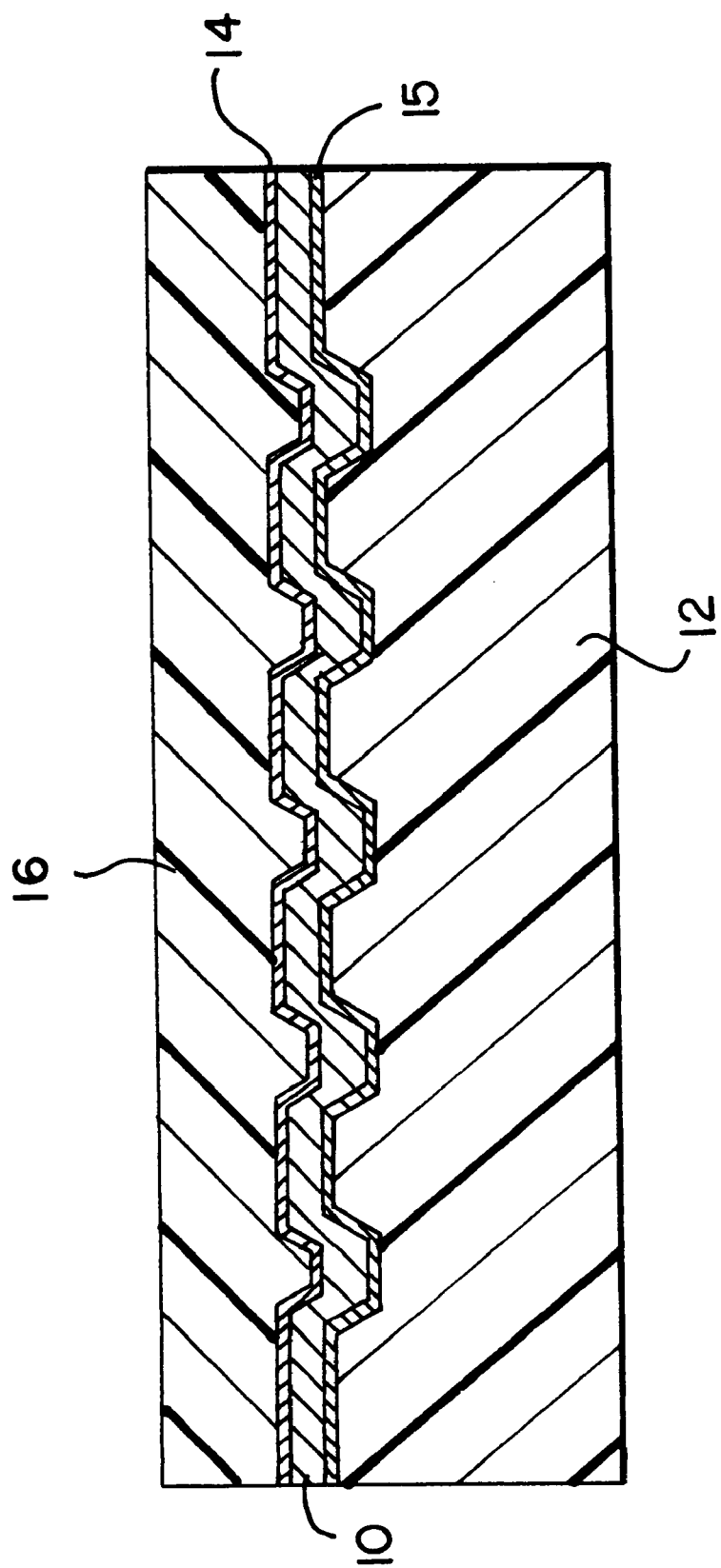
FIG. 1 is a schematic representation of the disc substrate, active dye layer, reflective layer, and protective lacquer layer for a recordable optical memory disc, including preferred embodiments of the interface conditioning barrier layer formed in accordance with the teachings of the method of the present invention.

The present invention relates to a method for conditioning the surface of an injection molded polymeric substrate used during the manufacture of an optical memory disc, and more particularly, to a method for forming an interface conditioning barrier layer between the active recording layer and the disc substrate used during the production of a write once optical memory disc, such as a CD-R or DVD-R optical memory disc.

Referring now to FIG. 1, there is illustrated a schematic representation of a typical commercially available "write once" optical memory disc. As illustrated in FIG. 1, a typical structure of a CD-R or DVD-R optical memory disc includes an energy absorbing dye layer 10 deposited directly over a polymeric substrate 12. Next, a thin film reflective layer 14 is formed directly over the dye layer 10, usually via magnetron sputtering. Finally, a radiation curable protective lacquer 16 is applied directly over the reflective film layer 14.

The pre-treatment/pre-coat solution of the present invention provides an economical means of forming an interface conditioning barrier layer between the dye coating solution and/or the active dye layer 10 and the substrate material 12. Typically, the substrate (12) is formed by an injection molding process, and is made from polymeric material such as polycarbonate or poly methyl methacrylate. Alternate substrate forming methods, such as injection/compression molding, compression molding, casting, and radiation curing can be employed, alone or in combination therewith. The interface conditioning pre-treatment/pre-coat solution serves to purge the substrate surface of contaminants, and eliminate or reduce the extraction of residual chemical substances from the substrate material by the solvents used for the dye solution. These contaminants and extractables include stabilizers, molding release agents, degraded polymer, residual monomer (etc.), and various adsorbed contaminants from the local environment. By purging the substrate surface of contaminants, and eliminating or reducing the extraction of residual chemical substances, a more uniform and consistent dye coating can be formed. Additionally, the excess dye solution, that is spun off of the disc during the spin coating operation, contains lower levels of these contaminating substances. The accumulation of these substances in the dye solution limits the number of times the dye can be recycled in the manufacturing process.

As aforementioned, traditionally, barrier layers used in the manufacture of optical memory discs are formed using vacuum deposition technology. This approach, while effective, adds a complex and expensive process step.

Barrier layers may also be formed via various spin coating techniques. However, where vacuum deposited films typically conform to and reproduce the underlying surface contours, traditional spin coated barrier layers are specifically intended to planarize the underlying surface. Unless the aforementioned conditions are met, it is undesirable to planarize the pre-groove structure of a CD-R or DVD-R substrate. Additionally, these traditional approaches require a post application cure before the next layer can be applied. Consequently, the tendency to planarize the pre-groove structure, and the additional time, complexity, and expense associated with these methods render them unacceptable for CD-R and DVD-R optical memory disc production.

In contrast, as set forth herein, the pre-treatment/pre-coat of the present invention is simple, inexpensive, and is easily integrated into existing manufacturing processes. Further, it is effective when employed as either a surface treatment or a surface coating which, additionally, may form a functional part of the coating stack.

As aforementioned, the present invention provides an interface conditioning barrier layer between the active dye layer 10 and the substrate 12, by means of the application of a pre-treatment/pre-coat solution. This interface conditioning barrier layer is represented by the reference number 15 in FIG. 1. Therefore, as shown in FIG. 1, the interface conditioning barrier layer 15 is over coated with the dye layer 10, a reflective film layer 14 is formed over the dye layer, and a protective lacquer layer 16 is formed over the reflective film layer 14.

With the exception of the interface conditioning barrier layer 15, this structure is similar to that of commercially available "write once" optical memory discs, such as CD-R and DVD-R optical memory discs.

When a recording is made on a commercially available CD-R or DVD-R disc, the laser energy absorbed by the dye layer causes the dye to vaporize and/or decompose. Depending on the dye being used, the immediate effect of recording can range from complete decomposition of the dye, to a temperature/pressure related distortion of the surrounding area. Typically, both effects occur to a varying degree. Additionally, in most CD-R and DVD-R discs, the dye/substrate interface is fused into a mixture of dye and substrate by-products, which can degrade CNR and jitter performance. The dye/reflective layer interface is also distorted. All of these effects contribute to the characteristics of the read-back signal. The resulting overall change in optical properties, associated with the recording process, causes reduced playback reflectivity where recorded marks are made.

In the generally preferred implementation, where the interface conditioning barrier layer is thin, there are no noticeable changes in record/read back behavior. As layer thickness increases, secondary effects begin to develop. These secondary effects include changes in jitter, MLD, reproduced waveform shape, pre-groove diffraction, and reflectivity. It has been found that selecting a surface modifier with a refractive index approximating that of the substrate (approximately 1.55 for polycarbonate, and approximately 1.49 for poly methyl methacrylate), with or without significant absorption at the write/read laser wavelengths, allows the use of a film thickness that partially planarizes the pre-groove structure without creating complex optical interference effects.

In the preferred embodiment, the surface modifier has a refractive index between approximately 1.45 to 1.57. As a result of utilization of a surface modifier for the pre-treatment/pre-coat solution having a refractive index within this range, the pre-treatment/pre-coat does not significantly alter the optical tuning of the thin film coating stack.

Further, by selecting a material that decomposes before the substrate surface is significantly altered by the recording process, actual groove geometry can be dynamically changed by the recording process. This effect can be used to extend the acceptable range of initial substrate pre-groove profiles.

The pre-treatment/pre-coat solution used to purge the substrate surface of contaminants, extract volatiles from the substrate, dilute them and wash them away, and then form the interface conditioning barrier layer 15, can be applied in various manners. However, one of the main objectives of the present invention is to apply the pre-treatment/pre-coat solution in a cost effective manner. A particularly cost effective way to apply the pre-treatment/pre-coat solution, wash the disc, and form the interface conditioning barrier layer 15, is via a spin rinsing/spin coating process. Because the polymeric substrate is directly exposed to the solvents used for the pre-treatment/pre-coat solution, these solvents must be selected to provide the required wetting, cleaning, and coating characteristics without adversely effecting the surface of the substrate. Moreover, the carrier solvents for the dye cannot have significant solvency action on the modified substrate surface.

Therefore, the selection of the pre-treatment/pre-coat system, and the selection of the dye carrier solvent system must be considered together.

In order to accomplish the objectives of the present invention, the following pre-treatment/pre-coat solutions were investigated and found to provide acceptable substrate cleaning and formation of a protective interface conditioning barrier layer between the disc substrate and the active dye recording layer:

1) approximately 0.01% to 4.0% poly vinyl alcohol; dissolved in a mixture of water and various co-solvents. Representative co-solvents include 2-butoxy ethanol, 2-propoxy ethanol, ethanol, methanol, isopropyl alcohol, and/or acetic acid.
2) approximately 0.01% to 5% poly alpha methyl styrene; dissolved in various terpenes and co-solvents.
3) approximately 0.01% to 5% cellulose acetate; dissolved in diacetone alcohol, 2-methoxyethanol, 2,2,3,3-tetrafluoro-1-propanol, and/or acetic acid.
4) approximately 0.01% to 5% poly vinyl butyral; dissolved in 2-butoxy ethanol, 2-propoxy ethanol, isopropyl alcohol, and/or acetic acid.
5) approximately 0.01% to 5% nitrocellulose; dissolved in 2-butoxy ethanol, 2-propoxy ethanol, with various co-solvents, such as methanol and N-butyl alcohol.

Of these materials, poly vinyl alcohol was found to be resistant to the widest range of dye carrier solvents, and exhibited the strongest tendency to form a functional monolayer.

For example: A solvent comprised of 50% water and 50% isopropyl alcohol was prepared. This solution exhibited excellent wetting characteristics when applied to the surface of injection molded polycarbonate. A second solution was prepared, using the same solvents in the same ratio, to which 0.05% poly vinyl alcohol was added. Test substrate "A" was then spin rinsed using the pure solvent mixture. Test substrate "B" was identically spin rinsed using the solvent mixture to which 0.05% poly vinyl alcohol was added. In both cases, the solutions were applied via syringe, starting at the outer edge of the discs and moving inwardly as the discs rotated at 500 RPM. After reaching the inner application diameter, dispensing was stopped and the discs were accelerated to 5000 RPM for spin drying. After drying, the two discs were inspected. There was no apparent difference in the visual appearance of the two discs.

In order to verify the presence of the poly vinyl alcohol layer, a water droplet contact angle test was performed on each disc. The contact angle observed on disc "A" (no PVA) was identical to that observed on a control disc which had not been spin rinsed, approximately 78 degrees. The contact angle observed on disc "B" was observed to be approximately 60 degrees. Both test discs were then rinsed in flowing water for 60 seconds. During this test, the water tended to bead up on disc "A", where it tended to wet the surface of disc "B". Both discs were spun dry, and the water droplet contact angle test was repeated. There was no apparent change in the results providing further evidence of formation of a poly vinyl alcohol layer on disc "B". Both test discs were then flow rinsed in 70° C. water for 15 seconds, immediately followed by a 30 second flow rinse in room temperature water. The discs were then spun dry, and the water droplet contact angle test repeated.

There was no change observed on disc "A". Disc "B" exhibited an approximately 5 degree increase in contact angle, changing to approximately 65 degrees. Finally, both discs were spin rinsed in a mixture of 90% 2-propoxy ethanol and 10% glacial acetic acid, then spun dry. In each case, total solvent wet time was 15 seconds. The water droplet contact angle test was then repeated. There was no observed change on disc "A". The modified contact angle on disc "B" was retained. This result indicates that a solution of 90% 2-propoxyethanol and 10% glacial acetic acid, when applied over an extremely thin layer of poly vinyl alcohol, was unable to extract substances from the polycarbonate substrate that effected water droplet contact angle. Given that water is an excellent solvent for poly vinyl alcohol, these results also indicate the poly vinyl alcohol formed a molecular level bond with the surface of the polycarbonate substrate.

A 2% solution of poly vinyl alcohol was prepared, using 50% water and 50% isopropyl alcohol as the solvent. This solution was spin coated onto multiple polycarbonate test substrates, in the same manner as previously described. After spin drying, the coated substrates were held at a 45 degree angle and various dye carrier solvents were poured over one sector of each disc. These solvents included diacetone alcohol, N-butyl alcohol, 2-butoxyethanol, 2-propoxyethanol, isopropyl alcohol, and octane. After excess solvent was allowed to flow off, each disc was spun dry. In each case, no apparent difference between the solvent rinsed and non-solvent rinsed areas was observed. Next, the same test discs were again held at a 45 degree angle and room temperature water was poured over a previously un-rinsed sector of each disc.

After excess water was allowed to flow off of the discs, they were spun dry. In each case, a very apparent change in appearance was observed in the water rinsed sector. It appeared that the coatings had been removed by the water rinse. Finally, a water droplet contact angle test was performed in the water rinsed sectors. In each case, a contact angle of approximately 60 degrees was observed. This is the same contact angle observed in the previously described 0.05% PVA spin rinsing test. These results indicate the 2% polyvinyl alcohol coating was substantially unaffected by various, representative dye carrier solvents, but was re-dissolved and rinsed away by water. It also demonstrates that an effective interface conditioning, molecular level, bond was established between the poly vinyl alcohol and the polycarbonate substrate.

While the present invention has been particularly shown and described with reference to certain preferred embodiments, it will be readily apparent to those of ordinary skill in the art that various changes and modifications may be made therein without departing from the spirit and scope of the invention. It is intended that the appended as well as various other such changes and modifications.

What is claimed is:

1. An optical memory disc having a protective barrier layer between the disc substrate and the active dye layer wherein said barrier layer is produced by applying a pre-treatment/pre-coat solution to the disc substrate including a surface modifier having a refractive index approximately equal to the refractive index of the substrate.

2. The optical memory disc of claim 1 wherein the surface modifier has a refractive index of between approximately 1.45 to 1.57.

3. The optical memory disc of claim 1 wherein the surface modifier is selected from the group insisting of poly vinyl alcohol, poly alpha methyl styrene, cellulose acetate, poly vinyl butyral and nitrocellulose.

4. The optical memory disc of claim 1 wherein the surface modifier is polyvinyl alcohol with a weight percentage of between approximately 0.01% to 4.0%.

5. The optical memory disc of claim 4 wherein the solvent is selected from the group consisting of water, 2-butoxy ethanol, 2-propoxy ethanol, ethanol, methanol, isopropyl alcohol and acetic acid.

6. The optical memory disc of claim 1 wherein the surface modifier is poly alpha methyl styrene with a weight percentage of between approximately 0.01% to 5%.

7. The optical memory disc of claim 6 wherein the solvent is a terpene.

8. The optical memory disc of claim 1 wherein the surface modifier is cellulose acetate with a weight percentage of between approximately 0.01% to 5%.

9. The optical memory disc of claim 8 wherein the solvent is selected from the group consisting of diacetone alcohol, 2-methoxy ethanol, 2, 2, 3, 3-tetrafluoro-1-propanol, and acetic acid.

10. The optical memory disc of claim 1 wherein the surface modifier is poly vinyl butyral with a weight percentage of between approximately 0.01% to 5%.

11. The optical memory disc of claim 10 wherein the solvent is selected from the group consisting of 2-butoxy ethanol, 2-propoxy ethanol, isopropyl alcohol and acetic acid.

12. The optical memory disc of claim 1 wherein the surface modifier is nitrocellulose with a weight percentage of between approximately 0.01% to 5%.

13. The optical memory disc of claim 12 wherein the solvent is selected from the group consisting of 2-butoxy ethanol, 2-propoxy ethanol, methanol and N-butyl alcohol.

14. An optical memory disc having a protective barrier layer between the disc substrate and the active dye layer wherein said barrier layer is produced by applying a pre-treatment/pre-coat solution to the disc substrate including a surface modifier comprised of poly vinyl alcohol with a weight percentage of between approximately 0.01% to 4.0% and a solvent selected from the group consisting of water, 2-butoxy ethanol, 2-propoxy ethanol, ethanol, methanol, isopropyl alcohol and acetic acid.

15. An optical memory disc having a protective barrier layer between the disc substrate and the active dye layer wherein said barrier layer is produced by applying a pre-treatment/pre-coat solution to the disc substrate including a surface modifier comprised of poly alpha methyl styrene with a weight percentage of between approximately 0.01% to 5.0% and a solvent which is a terpene.

16. An optical memory disc having a protective barrier layer between the disc substrate and the active dye layer wherein said barrier layer is produced by applying a pre-treatment/pre-coat solution to the disc substrate including a surface modifier comprised of cellulose acetate with a weight percentage of between approximately 0.01% to 5% and a solvent selected from the group consisting of diacetone alcohol, 2-methoxy ethanol, 2, 2, 3, 3-tetrafluoro-1-propanol, and acetic acid.

17. An optical memory disc having a protective barrier layer between the disc substrate and the active dye layer wherein said barrier layer is produced by applying a pre-treatment/pre-coat solution to the disc substrate including a surface modifier comprised of poly vinyl butyral with a weight percentage of between approximately 0.01% to 5% and a solvent selected from the group consisting of 2-butoxy ethanol, 2-propoxy ethanol, isopropyl alcohol, and acetic acid.

18. An optical memory disc having a protective barrier layer between the disc substrate and the active dye layer wherein said barrier layer is produced by applying a pre-treatment/pre-coat solution to the disc substrate including a surface modifier comprised of nitrocellulose with a weight percentage of between approximately 0.01% to 5% and a solvent selected from the group consisting of 2-butoxy ethanol, 2-propoxy ethanol, methanol, and N-butyl alcohol.

19. A method for forming a protective barrier layer between a disc substrate and an active dye layer during production of an optical memory disc, said method comprising the step of applying a pre-treatment/pre-coat solution to the disc substrate including a surface modifier having a refractive index approximately equal to the refractive index of the disc substrate.

20. The method for forming a protective barrier layer between a disc substrate and an active dye layer during production of an optical memory disc of claim 19 wherein the surface modifier has a refractive index of between approximately 1.45 to 1.57.

21. The method for forming a protective barrier layer between a disc substrate and an active dye layer during production of an optical memory disc of claim 19 wherein the surface modifier is selected from the group consisting of poly vinyl alcohol, poly alpha methyl styrene, cellulose acetate, poly vinyl butyral and nitrocellulose.

22. The method for forming a protective barrier layer between a disc substrate and an active dye layer during production of an optical memory disc of claim 1 wherein the surface modifier is poly vinyl alcohol with a weight percentage of between approximately 0.01% to 4.0%.

23. The method for forming a protective barrier layer between a disc substrate and an active dye layer during production of an optical memory disc of claim 22 wherein the solvent is selected from the group consisting of water, 2-butoxy ethanol, 2-propoxy ethanol, ethanol, methanol, isopropyl alcohol and acetic acid.

24. The method for forming a protective barrier layer between a disc substrate and an active dye layer during production of an optical memory disc of claim 14 wherein the surface modifier is poly alpha methyl styrene with a weight percentage of between approximately 0.01% to 5%.

25. The method for forming a protective barrier layer between a disc substrate and an active dye layer during production of an optical memory disc of claim 24 wherein the solvent is a terpene.

26. The method for forming a protective barrier layer between a disc substrate and an active dye layer during production of an optical memory disc of claim 14 wherein the surface modifier is cellulose acetate with a weight percentage of between approximately 0.01% to 5%.

27. The method for forming a protective barrier layer between a disc substrate and an active dye layer during production of an optical memory disc of claim 26 wherein the solvent is selected from the group consisting of diacetone alcohol, 2-methoxy ethanol, 2, 2, 3, 3-tetrafluoro-1-propanol, and acetic acid.

28. The method for forming a protective barrier layer between a disc substrate and an active dye layer during production of an optical memory disc of claim 19 wherein the surface modifier is poly vinyl butyral with a weight percentage of between approximately 0.01% to 5%.

29. The method for forming a protective barrier layer between a disc substrate and an active dye layer during production of an optical memory disc of claim 28 wherein the solvent is selected from the group consisting of 2-butoxy ethanol, 2-propoxy ethanol, isopropyl alcohol and acetic acid.

30. The method for forming a protective barrier layer between a disc substrate and an active dye layer during production of an optical memory disc of claim 1 wherein the surface modifier is nitrocellulose with a weight percentage of between approximately 0.01% to 5%.

31. The method for forming a protective barrier layer between a disc substrate and an active dye layer during production of an optical memory disc of claim 30 wherein the solvent is selected from the group consisting of 2-butoxy ethanol, 2-propoxy ethanol, methanol and N-butyl alcohol.

32. A method for forming a protective barrier layer between a disc substrate and an active dye layer during production of an optical memory disc, said method comprising the step of applying a pre-treatment/pre-coat solution to the disc substrate including a surface modifier comprised of poly vinyl alcohol with a weight percentage of between approximately 0.01% to 4.0% and a solvent selected from the group consisting of water, 2-butoxy ethanol, 2-propoxy ethanol, ethanol, methanol, isopropyl alcohol and acetic acid.

33. A method for forming a protective barrier layer between a disc substrate and an active dye layer during production of an optical memory disc, said method comprising the step of applying a pre-treatment/pre-treat solution to the disc substrate including a surface modifier comprised of poly alpha methyl styrene with a weight percentage of between approximately 0.01% to 5.0% and a solvent which is a terpene.

34. A method for forming a protective barrier layer between a disc substrate and an active dye layer during production of an optical memory disc, said method comprising the step of applying a pre-treatment/pre-coat solution to the disc substrate including a surface modifier comprised of cellulose acetate with a weight percentage of between approximately 0.01% to 5% and a solvent selected from the group consisting of diacetone alcohol, 2-methoxyethanol, 2, 2, 3, 3-tetrafluoro-1-propanol, and acetic acid.

35. A method for forming a protective barrier layer between a disc substrate and an active dye layer during production of an optical memory disc, said method comprising the step of applying a pre-treatment/pre-coat solution to the disc substrate including a surface modifier comprised of poly vinyl butyral with a weight percentage of between approximately 0.01% to 5% and a solvent selected from the group consisting of 2-butoxy ethanol, 2-propoxy ethanol, isopropyl alcohol, and acetic acid.

36. A method for forming a protective barrier layer between a disc substrate and an active dye layer during production of an optical memory disc, said method comprising the step of applying a pre-treatment/pre-coat solution to the disc substrate including a surface modifier comprised of nitrocellulose with a weight percentage of between approximately 0.01% to 5% and a solvent selected from the group consisting of 2-butoxy ethanol, 2-propoxy ethanol, methanol and N-butyl alcohol.

* * * * *